United States Patent Office 3,840,440
Patented Oct. 8, 1974

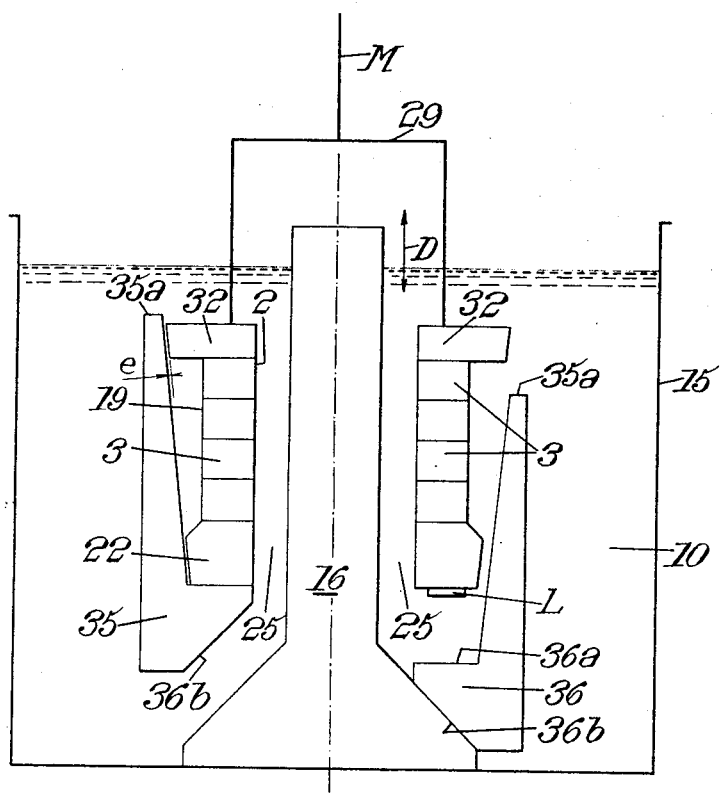

3,840,440
DEVICE AND METHOD FOR PRODUCING A COATING, ESPECIALLY ELECTROLYTIC ON THE WALLS OF MEMBERS EXPOSED IN SERVICE TO FRICTIONAL FORCES
Michel Durin, Paris, France, assignor to Societe Anonyme Automobiles Citroen, Paris, France
Filed Nov. 6, 1972, Ser. No. 303,783
Claims priority, application France, Nov. 9, 1971, 7140151
Int. Cl. B01k 3/00; C23b 5/56, 5/70
U.S. Cl. 204—25                      13 Claims

ABSTRACT OF THE DISCLOSURE

The device comprises means for stacking several identical members so that the surfaces of the members, oriented transversely with respect to the direction of stacking, are constituted by surfaces which are not exposed, in service, to frictional forces, separating means being provided between the stacked members, stack clamping means, sealing means arranged between the surfaces oriented transversely with respect to the direction of stacking, adapted to isolate these surfaces from a treatment bath, and electrical contact means for the passage of electrical current from one stack member to the other, these contact means being arranged between the members. The stack is immersed in a treatment bath contained in a vat and the electrical contact means are arranged inside the outer contour of said surfaces of the transversely oriented members with respect to the direction of stacking, sealing means completely surrounding the electrical contact means so as to insulate the latter from at least the outer space of the stack. The invention is especially valuable in the production of rotary piston engine casings.

---

The invention relates to a device for the production of a coating, especially electrolytic, on the walls of members exposed, in service, to frictional forces, which device comprises:

means for stacking several identical members so that the surface of the members, oriented transversely with respect to the direction of stacking, are constituted by surfaces which are not exposed, in service, to frictional forces, separating means being provided between the stacked members,
stack clamping means,
sealing means arranged between the surfaces oriented transversely with respect to the direction of stacking, adapted to isolate these surfaces from a treatment bath,
electrical contact means for the passage of electrical current from one member of the stack to the other, these contact means being arranged between the members.

The invention relates more particularly, because it is in this case that its application seems to offer the most advantage, but not exclusively, to a device for the production of an electrolytic coating on the trochoidal inner walls of rotary piston engine casings.

It is a particular object of the invention to render the abovesaid devices such that they respond better to the various exigencies of practice than hitherto and especially so that, not only does it enables the deposition of a coating to be avoided on the surfaces of said members which are not exposed in service to frictional forces, but also enables a coating to be produced with a minimum of faults while ensuring good conditions of transmission of electrical current from one member of the stack of the other.

According to the invention, the device of the type specified above is characterized by the fact that it is arranged to enable the immersion of the stack in a treatment bath contained in a vat and that electrical contact means are arranged inside the outer contour of the abovesaid surfaces of the members oriented transversely with respect to the direction of stacking, sealing means completely surrounding the electrical contact means so as to isolate the latter from the outer space, and if necessary, the inner space of the stack.

Preferably, the electrical contact means are constituted by at least one metallic cross-piece and the sealing means are constituted by at least one seal of plastics material or the like, surrounding the cross-piece, the thickness of the one or more seals, when the clamping means exert no force, being greater than that of the metallic cross-piece, the one or more seals being sufficiently flexible so that, when the clamping means are brought into play, the stacking members compress the seals and grip the metallic cross-piece which is in contact with the transverse surfaces of said members.

The electrical contact means can comprise several metallic cross-pieces and the sealing joint comprises then at least one plate of plastics materials or the like, provided with cavities in which the cross-pieces are housed.

When the device is intended for members bounded by two parallel flat lateral surfaces, as is the case for example for rotary piston engine casings, said members comprising holes in a direction perpendicular to the planes of the lateral surfaces, the device comprises advantageously pins for the centering of the members with respect to one another, provided to be engaged in at least two of said holes, which pins can advantageously comprise shoulders constituting the abovesaid metallic cross-pieces.

The metallic cross-piece can also be constituted by a metallic plate of which the outer contour is parallel to the inner contour of the lateral surfaces of the members, the outer contour of the metallic plate being situated inside the outer contour of the lateral surfaces.

The invention also relates to an installation for the production of an electrolytic coating on the walls of members exposed in service to frictional forces, which installation comprises a vat containing electrolyte, and an anode, this installation being characterized by the fact that the cathode is constituted by a stack formed by means of a device such as previously defined, said installation being arranged to enable the immersion of the stack in the bath contained in the vat.

The invention relates also to a method for producing a coating, especially electrolytic, on the walls of members exposed in service to frictional forces, according to which several identical members are stacked so that the surfaces of the members, oriented transversely with respect to the direction of stacking, are constituted by surfaces which are not exposed, in service, to frictional forces, separating means are placed between the stacked members, sealing means are arranged between the abovesaid surfaces oriented transversely with respect to the direction of stacking, to isolate these surfaces from a treatment bath, electrical contact means are arranged between the members for the passage of current from one member of the stack to the other and a clamping force is exerted on the so-constituted stack, which method is characterized by the fact that electrical contact means are arranged inside the outer contour of the abovesaid surfaces of the parts oriented transversely with respect to the direction of stacking, so that these contact means are completely surrounded by sealing means so as to insulate the means from contact with the outer or inner space of the stack and immersing the stack in a treatment bath contained in a vat.

The invention consists, apart from the features explained above, of certain other features which will be more fully considered below with regard to preferred embodiments of the invention which will not be described in more detailed manner with reference to the accompanying drawings, but which are to be regarded as in no way limiting.

FIG. 6, lastly, shows diagrammatically, a band adapted to prevent coating of the outer peripheral wall of the stacked members.

Figure 1:
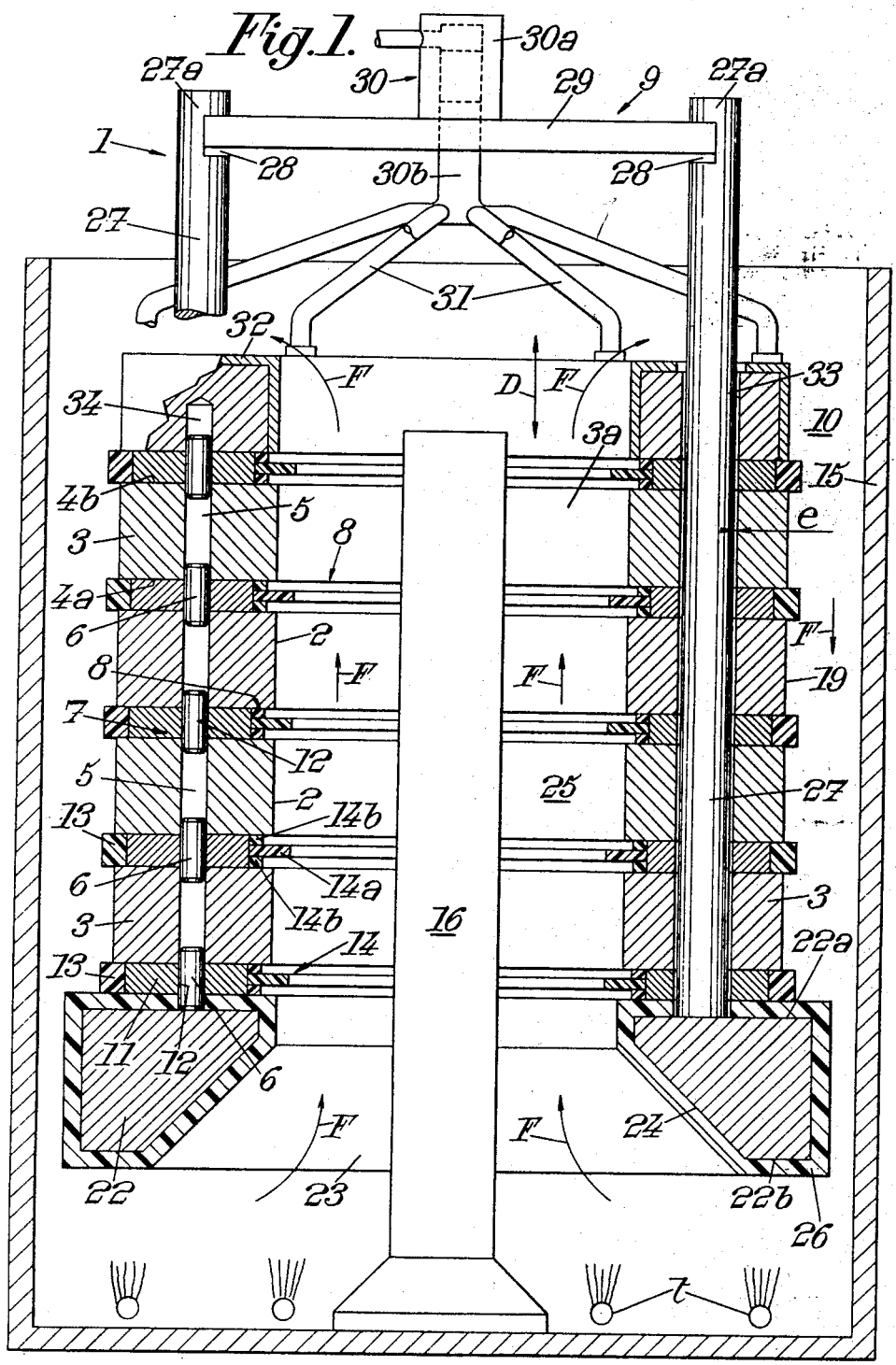
FIG. 1 shows diagrammatically, in staggered sections, with portions removed, a device constructed according to the invention.

Referring to FIG. 1, there can be seen a device 1 for producing an electrolytic coating on trochoidal inner walls 2 of casings 3 for rotary piston engines. These walls 2 are exposed in service to considerable frictional forces. Since the casings 3 are generally formed of a light alloy, especially of aluminium alloy with a high content of silicon, to obtain a sufficient resistance to friction of said walls 2, there is deposited on the latter by the electrolytic route, a metallic coating essentially comprising nickel.

The device 1 is arranged so as to enable stacking of several casings 3, four in the case of FIG. 1, said stacking being such that the surfaces 4a, 4b oriented transversely with respect to the direction D of stocking are constituted by parallel lateral flat surfaces of the casings 3, which surfaces are not exposed, in service, to frictional forces. The inner cavity 3a of a casing 3 opens on each of the surfaces 4a, 4b.

Holes 5 extend in the direction D perpendicular to the planes of the lateral surfaces 4a, 4b and pass through the casings 3 from one side to the other. Centering of the stacked casings, with respect to one another, is ensured by pins 6 adapted to penetrate into the facing ends of bores 5 of two neighboring casings 3. The pins 6 are aligned, as seen in the left hand portion of FIG. 1. There is provided at least two lines of pins 6 in the holes 5 to ensure correct centering of the casings 3.

The holes 5 are provided to enable the passage of fixing means for lateral flanges (not shown) against the surfaces 4a, 4b.

Separating means 7 are provided between the stacked casings 3 to keep separated from one another the lateral surfaces 4a, 4b of two neighbouring casings.

Sealing means 8 are arranged against the surfaces 4a, 4b and clamping means 9 are provided to cause compression of the abovesaid sealing means 8 so that the latter isolate the surfaces 4a, 4b from any contact with the ambient medium, especially from any contact with a treatment bath 10 in which the casings 3 can be plunged. Tubes t are provided in the bottom of the bath to enable air to be blown into it to agitate the bath and render it homogeneous.

Figure 4:
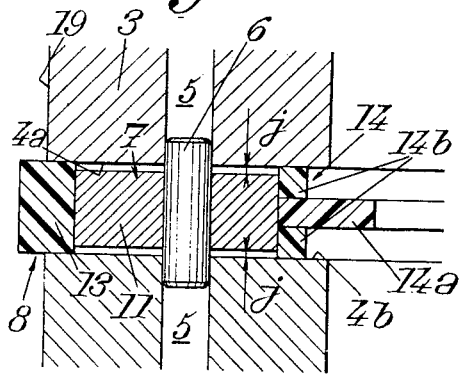
FIGS. 4 and 5 show, respectively, without and with clamping, a modification of the separating and sealing means.
Figure 5:
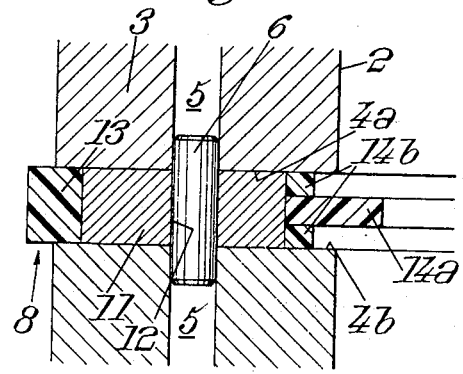

In the embodiment of FIGS. 1, 4 and 5, separating means 7 are constituted by a metallic cross-piece 11 constituted for example by an aluminium or titanium plate, of which the outer and inner contours are parallel, respectively, to those of the surfaces 4a, 4b, but are comprised between the latter when the cross-piece 11 is suitably centered. The outer contour of the cross-piece 11 is hence situated inside the outer contour of the surfaces 4a, 4b. The centering of this cross-piece 11 is ensured by the pins 6 which are force-fitted into holes 12 pierced in the cross-piece 11.

Sealing means 8, associated with the cross-piece 11, comprise two seals 13, 14, mating respectively the outer and inner contours of the cross-piece 11. The seals 13 and 14 entirely surround the cross-piece 11 and isolate the latter from any contact with the electrolytic bath 10. In relaxed position, that is to say when the clamping means 9 do not exert their force on the stack of casings 3, the thickness of the seals 13, 14 is greater than that of the cross-piece 11 (see FIG. 4); when the clamping force is exerted, the seals 13 and 14 are compressed until the cross-piece 11 comes into contact with the surfaces 4a, 4b. This contact of metallic portions is used to ensure the passage of the electrical current from one casing to the other. This occurs especially when the stack is immersed in an electrolytic vat 15 (FIG. 1) comprising an anode 16, said stack then constituting a cathode which surrounds the anode. The cross-piece 11 constitutes therefore an electrical contact means between the casings 3.

The outer seal 13 is formed of flexible plastics material for instance of flexible vinyl and has a rectangular cross-section. The inner seal 14 is composed of a central portion 14a of hard plastics material, arranged between two portions 14b of flexible plastics material, for example of flexible vinyl. The portion 14a overlaps radially towards the inside of the cavities of the casings 3. The connection of the flexible seals 13, 13b, to the metallic cross-piece 11 can be effected, either by glueing, or preferably by fitting, the latter solution offering a greater facility for mounting and dismounting flexible seals when it is necessary to replace them after wear or tearing.

The play j (FIG. 4) before clamping, between the surfaces of the cross-piece 11 and the lateral surfaces 4a, 4b, determines the compression of the flexible seals, on each surface, on the bringing into action of the clamping means 9. The play j is selected so as to be of the order of 0.1 millimetre to 1 millimetre.

Figure 2:
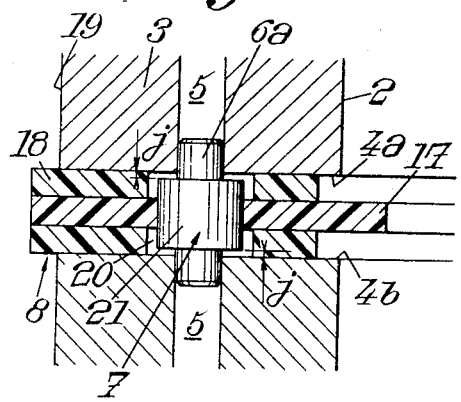
FIG. 2 shows a first embodiment of the means for sealing and separation of the stacked members, the clamping means exerting no compression on the stack.
Figure 3:
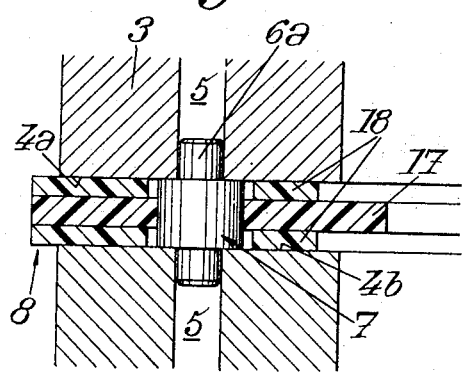
FIG. 3 shows the elements of FIG. 2 when the clamping means are in gripping condition.

In the modification shown in FIGS. 2 and 3, the sealing means 8 comprise a composite plate of plastics material constituted by a central plate 17, of hard plastics material, whose inner and outer contours are parallel respectively to those of the surfaces 4a, 4b, said plate overlapping radially, towards the inside and outside, the contours of the surfaces 4a, 4b. This plate 17 is arranged between two plates 18 of flexible material whose outer contours are identical with that of plate 17 and of which the inner contours are parallel to the inner contour of the plate 17 situated, radially, in the vicinity of the inner contour of the surfaces 4a, 4b. The plate 17 is traversed by a pin 6a, the latter being fixed on said plate. These centering pins 6a comprise a cylindrical shoulder 21, in their middle portion, of diameter greater than that of the holes 5 provided in the casings 5. The ends of the pins 6a are adapted to be engaged in these holes 5. The plates 18 comprise holes 20 of diameter greater than that of the shoulder 21. The total thickness of the plates 18 and 17 is greater than the thickness of the shoulders 21 so that, when the stack is not subject to a clamping force (see FIG. 2), there exists between each surface 4a, 4b, and the surface of the end neighboring the shoulder 21, a play j similar to that indicated in FIG. 4. On clamping of the stack, the compression of the plates 18 is produced until the terminal surfaces of the shoulder 21 come into contact with the surfaces 4a, 4b (see FIG. 3). These shoulders 21 hence constitute electrical contact means ensuring passage of the current from one casing 3 to the other. The number of pins 6a is at least equal to 2. The pins 6a and the shoulders 21 are entirely surrounded by a sealing means 8 so as to be isolated from the treatment baths.

With the device according to the invention, an internal cathodic contact is ensured between the casings 3. The electrical contact means are shielded from the treatment bath 10 when the stack is immersed in this bath. Any intermediate solution between that of FIGS. 2 and 3 and that of FIGS 1, 4 and 5, is obviously possible to ensure the passage of the electrical current. It suffices for the contact surface to be sufficient to enable the passage of the current without heating, but however not too large, in order to enable sufficient pressure per unit surface enabling local compression of the layer of alumina when the cross-pieces 11 or the shoulders 21 are of aluminum, which condition is necessary for free contact. It will be noted that the pins serving for the centering of the casings with respect to one another can be separated from the metallic cross-pieces ensuring the electrical contact. The operations of centering and of the transmission of the electrical current will then be effected by independent parts.

It will be noted that, in accordance with the preceding explanations, the sealing means 8 in FIGS. 2 and 3 or in FIGS. 1, 4 and 5, comprise a central opening whose contour is parallel to that of the cavity 3a of the members 3.

In addition, as to the two solutions which have been mentioned enabling the use of seals of very flexible plastics material, the clamping force required to ensure sealing is limited to that necessary for the establishment of good cathodic contact between the cross-piece 11 or the shoulder 21 and the surfaces 4a, 4b. The force is exerted practically entirely on said cross-piece 11 or said shoulders 21.

The fault in parallelism of the surfaces 4a, 4b of a same casing 3 being negligible since it is of the order of $1/100$ to $2/100$ of a millimeter cannot be troublesome, taking into account the compression of the seals which is of the order of 0.1 millimeter to 1 millimeter.

The clamping means 9, as shown in FIG. 1, comprise a lower frame 22 bounded by two parallel flat surfaces 22a, 22b.

The frame 22 comprises a central cavity 23 opening on each of the surfaces 22a, 22b.

The inner and outer contours of the upper surface 22a of the frame 22 are parallel, respectively, to the inner and outer contours of the surface 4a of the lower casing 3 of the stack, said stack resting on the frame 22.

Sealing and separating means similar to those provided between the casings 3 are arranged between the surface 4a of the lower casing of the stack and the frame 22.

The transverse section of the frame 22 has substantially the shape of a rectangular trapezium, as seen in FIG. 1, whose side 24 inclined to the parallel bases, separates from the axis of the cavity 23 in proceding from the upper surface 22a towards the lower surface 22b.

The cavity 23 therefore has a downwardly flared opening. On operating the electrolytic coating, to ensure the renewal of the electrolyte confined in the tubular space 25 between the anode 16 and the inner walls 2 of the stacked casings 3 which constitute the cathode, the stack is agitated vertically. On each downward movement of the stack and of the frame 22, the electrolyte of the tubular space 25 is driven upward and dispersed in the electrolyte situated in the upper portion of the bath 10. A circulation of electrolyte is established along the arrows F of FIG. 1.

In the case where the stack of casings 3 would be agitated vertically and horizontally, for example by means of a crank-rod system, there could be provided, in place of the flared opening 23 or in addition, openings (not shown) in the sealing means 8 of FIGS. 2 and 3 or FIGS. 4 and 5, so that circulation between the space 25 and the space surrounding the stack is established under the action of the horizontal agitation of said stack, the electrical contact means being always insulated from the treatment bath by the sealing means.

The frame 22 is preferably formed of titanium and is covered by a sheath 26 of plastics material.

At least two cylindrical columns 27, preferably of titanium, oriented parallel to the direction D, are fixed to the frame 22 and pass through a line of holes 5. There exists a play e (FIG. 1) between the outer surfaces of the columns and the inner surfaces of the holes 5, sufficient to enable the engagement of the columns 27 in said holes and thus to guide the casings 3, on the stacking operation, without causing jamming.

These columns 27 pass through the whole stack of casings 3 and project out of the stack at their uper portions 27a. Notches 28 are provided in said portions 27a to cooperate with the ends of a cross-member 29. The notches 28 are turned towards one another. Clamping means 9 comprise also a jack 30 whose cylinder 30a is fixed on the cross member 29 and of which the stem 30b, turned towards the stack of casings 3 and oriented parallel to the direction D, is connected to arms 31 adapted to be supported on a ring 32 of shape similar to that of a casing 3. The arms 31 are six in number, for example, and their support points on the ring 32 are equidistant so that the clamping is equally distributed over the surfaces 4a, 4b.

Sealing and separating means, similar to those provided between the casings, are arranged between the surface 4b of the upper casing of the stack and the ring 32 of the upper centering pins 5. The latter is traversed by holes 33 enabling the passage of the columns 27 and comprises recessed holes 34 adapted to cooperate with the upper centering pins 5.

The jack 30 can be pneumatic or hydraulic. In a modification, the jack 30 could be replaced by an electromagnetic device, or a screw and nut device, adapted to exert a clamping force in the same manner as the jack 30.

The clamping must be permanent from start to finish of the treatment operations and must especially ensure complete sealing by the sealing means 8 on the chemical preparation of the walls to be coated, to avoid any absorption and retention of the baths, and on electrolytic coating operations in order to avoid corrosion and deposition on the lateral surfaces 4a, 4b which, later, serve as reference planes.

The clamping means shown in FIG. 1 enable permanent clamping of the stack to be ensured without it being necessary to maintain connection to the pressure source of the cylinder 30a. In fact, when the pressure has been established in said cylinder, it is possible to isolate it in sealed manner and to separate it from the source of pressure so that clamping force is maintained on the stack. Thus, on movements of the stack of the casings 3 from one bath to another, no impediment is caused by possible passages connecting the cylinder 30 to a source of pressure. There could be provided also a mechanical device adapted to lock the stack in the clamped position, so that if a leakage of fluid under pressure enclosed in the cylinder 30a is produced, a clamping force will in spite of all, be kept on said stack when the jack 30 is separated from the source of pressure. The clamping means shown in FIG. 1 also constitute means for stacking the members.

In a modification, the columns 27a of the clamping means could be arranged so as not to pass through the holes such as 33 of the stacked parts.

The clamping means also constitute handling means for the whole of the stack enabling it to be moved and immersed in several successive treatment baths. Removal and shaking means, for example vertical, for the stack are engaged, for example, on the transverse member 29. A portion of these displacement and shaking means M has been shown diagrammatically in FIG. 6.

Referring to FIG. 6, there can be seen, shown diagrammatically, the stack of casings 3 immersed in a treatment bath 10, the anode 16 being surrounded by said casings 3. An outer belt 35, for protection, is provided to prevent or reduce the coating of the outer peripheral walls 19 of the casings 3, said walls 19 not being exposed in service, to frictional forces.

The belt or girdle 35 is constituted by a substantially cylindrical wall, whose transverse section is parallel, but external, to the contour of the cross-sections of the walls 19. The wall forming the envelope 35 is open at its two ends and to a length greater than that of the stack of the casings 3, in the direction D. At its lower portion, the girdle 35 comprises a rim 36 projecting radially inwardly, and having a flat upper surface 36a and an inclined surface 36b as seen in FIG. 6.

When the stack of casings 3 is introduced into the bath 10, the stack is lowered until the frame 22 comes to be supported on the surface 36a of the girdle 35 and assembly means L then ensure automatic fixing of the girdle 35 on the frame 22. During the whole operation of electrolytic coating, the girdle 35 will follow the vertical alternating movements of the stack of casings 3, as seen in the left hand portion of FIG. 6. The upper edge 35a of the girdle 35 is situated at a level above that of the upper surface of the ring 32. The radial play e between the inner frustroconic surface of the girdle 35 and the frustroconic outer lateral surface of the ring 32 and of the frame 22 is of the order of 1/10 of a millimetre.

The girdle 35 plays the role of mask forming an obstacle for the lines of the current thus preventing or reducing electrolytic deposition on the walls 19 of the casings 3. It is not necessary to provide fluid tightness between the girdle 35 and said stack.

In the diagram of FIG. 6, it is assumed that the anode 16 remains fixed in the vat 15, on operation of the electrolytic coating operation and on the vertical agitation of the stack of casings.

If the anode 16 were movable and followed the vertical movements of said stack, the outer girdle 35 could then be rigidly fixed to the anode 16.

It will be noted that in the assembly of FIG. 6, it is no longer useful for the frame 22 to comprise a flared lower opening like the opening 23 of FIG. 1. It is the wall 36b of the girdle 35 which determines a flared opening and which contributes to the formation of a catholytic circulation in the space 25.

Due to the contiguous stacking device according to the invention, an electrolytic coating of the surfaces 4a, 4b or at least of the portions of these surfaces which have to serve as reference planes, is avoided. As a result the number of later machining operations is reduced and an economy of the preparing and electrolysis baths is effected. The deposition on the outer walls 19 can also be avoided by means of the girdle 35.

The inner cathodic contact obtained with the cross-pieces 11 or the shoulders 21 is advantageous since when the stack is immersed in a treatment bath, the electrolytic contact means between the parts are isolated from the bath. The passage of the current is effected under good conditions, and the life duration of the contact means is prolonged.

It should be noted that to obtain good coating of the surface, with the minimum of faults, the total immersion of the parts to be coated in the treatment bath, with agitation of these parts, for example vertical, gives the best results; the bath can itself be kept in motion by blowing in air, as provided according to one feature of the invention.

However if the stack of parts is kept motionless with respect to the vat and if only the treatment bath is kept in motion against the parts (circulation of the bath by a pump) the quality of the coating is not as good as in the preceding case.

I claim:
1. Device for forming a coating, especially an electrolytic coating, on the inner surfaces of identical members exposed in service to frictional forces, said device comprising:
means for stacking several said members so that the surfaces of the members, oriented transversely with respect to the direction of stacking, are constituted by surfaces which are not exposed in service to frictional forces, separating means being provided between the stacked members,
said stacked members thus defining an inner free space, stack clamping means,
sealing means arranged between the surfaces oriented transversely with respect to the direction of stacking, adapted to isolate these surfaces from a treatment bath, and
electrical contact means for the passage of electrical current from one stack member to the other, these contact means being arranged between said transversely oriented surfaces, said device being arranged to enable the immersion of the stack in a treatment bath contained in a vat and so that the electrical contact means are arranged inside the outer contour of said surfaces of the transversely oriented members with respect to the direction of stacking, the sealing means being provided completely surrounding the electrical contact means so as to insulate the latter from the outer, and if necessary, the inner space of the stack.

2. Device according to claim 1, wherein the electrical contact means are constituted by at least one metallic cross-piece and the sealing means are constituted by at least one seal of plastics material or the like, surrounding the cross-piece, the thickness of the one or more seals, when the clamping means do not exert pressure, being greater than that of the metallic cross-piece, said at least one seal being sufficiently flexible so that when the clamping means are brought into play, the stacked members compress the seals and grip the metallic cross-piece, which is in contact with the transverse surfaces of said members.

3. Device according to claim 2, comprising several metallic cross-pieces and wherein the seal comprises at least one plate of plastics material or the like, provided with cavities in which the cross-pieces are housed.

4. Device according to claim 3, for members limited by two parallel flat lateral surfaces, especially for rotary piston engines, said members comprising holes in a direction perpendicular to the planes of said lateral surfaces, and comprising pins for the centering of the members with respect to one another, provided to be engaged in at least two of said holes, these pins including shoulders constituting the abovesaid metallic cross-pieces.

5. Device according to claim 2, wherein the metallic cross-piece is constituted by a metallic plate whose outer contour is parallel to the outer contour of the surfaces of the members oriented transversely with respect to the direction of stacking, the outer contour of the plate being situated inside the outer contour of said transverse surfaces.

6. Device according to claim 5, for members limited by two parallel plane lateral surfaces, and provided with an inner cavity opening on each of the lateral surfaces, especially for rotary piston engine casings wherein the metallic plate, forming the cross-piece, has an inner contour which is parallel to the inner contour of the lateral surfaces of the members and comprised between the inner and outer contours of said parallel surfaces, the sealing means being constituted by two seals of plastics material or the like, mating respectively the contours of the inner and outer edges of the cross-piece.

7. Device according to claim 6, wherein the seal mating the outer edge of the cross-piece is formed of flexible plastics material, while the seal mating the inner edge of said cross-piece comprises a central portion of hard plastics material arranged between two portions of flexible plastics material.

8. Device according to claim 5, comprising centering pins, for the stacked members, housed in the metallic plate.

9. Device according to claim 1, wherein the clamping means comprise a lower frame on which the various stacked members are arranged, the lower frame comprising a central downwardly flared opening and at least two columns, parallel to the direction of stacking, fixed on the frame, and adapted to project, by their upper ends, above the stack of members, said clamping means comprising also, above said stack, a transverse member adapted to cooperate with the columns and thrust means provided to be supported on said transverse member and to exert a clamping force on a ring arranged on the upper member of the stack.

10. Device according to claim 1, for members comprising an inner cavity opening on the surfaces oriented transversely with respect to the stack, wherein the sealing means comprise a central opening whose contour is parallel to the inner contour of the surfaces of the members oriented transversely with respect to the direction of stacking.

11. Device according to claim 1, comprising assembly means, enabling at the time of an electrolytic coating operation the device to be connected to a band intended to surround the stack of members, said band comprising a lower rim on which said stack is positioned, this band having an axial length greater than that of the stack and being adapted to resist coating of the outer peripheral surface of the stacked members.

12. Installation for effecting electrolytic coating on the walls of members exposed in service to frictional forces, which installation comprises a vat and an anode arranged in this vat, the cathode being constituted by a stack of members whose surfaces have to be coated, this stack being formed with a device which comprises: means for stacking several identical members so that the surfaces of the members, oriented transversely with respect to the direction of stacking, are constituted by surfaces which are not exposed in service to frictional forces, separating means being provided between the stacked members; stack clamping means; sealing means arranged between the surfaces oriented transversely with respect to the direction of stacking and adapted to isolate these surfaces from a treatment bath in which the stack is immersed; electrical contact means for the passage of electrical current from one part of the stack to the other, these electrical contact means being arranged between the members; said installation comprising means for enabling the immersion of the stack in the bath of the vat and the electrical contact means arranged inside the outer contour of the abovesaid surfaces of the parts oriented transversely with respect to the direction of stacking and completely surrounded by the sealing means so as to be isolated from the treatment bath contained in the vat.

13. Method for producing a coating, especially electrolytic, on the walls of members exposed in service to frictional forces, comprising stacking a plurality of identical members so that the surfaces of the members, oriented transversely with respect to the direction of stacking, are constituted by surfaces which are not exposed in service to frictional forces; placing separating means between the stacked members; arranging sealing means between said surfaces oriented transversely with respect to the direction of stacking, to isolate said surfaces from a treatment bath; arranging electrical contact means for the passage of current from one member of the stack to the other; exerting a clamping force on the thus constituted stack, the electrical contact means being arranged inside the outer contour of said surfaces of the parts oriented transversely with respect to the direction of stacking, the sealing means completely surrounding said electrical contact means so as to insulate said means from contact with the outer or inner space of the stack; and immersing the stack in a treatment bath contained in a vat.

References Cited

UNITED STATES PATENTS

| | | | |
|---|---|---|---|
| 1,268,465 | 6/1918 | Huggins | 204—9 |
| 3,051,633 | 8/1962 | Paull et al. | 204—297 W |
| 2,846,379 | 8/1958 | Chambers | 204—25 |
| 2,500,206 | 3/1950 | Schaefer et al. | 204—297 W |
| 2,431,948 | 12/1947 | Martz | 204—238 |

FOREIGN PATENTS

| | | | |
|---|---|---|---|
| 718,101 | 3/1942 | Germany | 204—26 |
| 1,007,128 | 4/1957 | Germany | 204—25 |

T. M. TUFARIELLO, Primary Examiner

U.S. Cl. X.R.

204—272, 297 R